Aug. 4, 1936.                M. SKRETA                2,050,131
COIN FREED LIQUID DISPENSING APPARATUS
Filed March 31, 1933
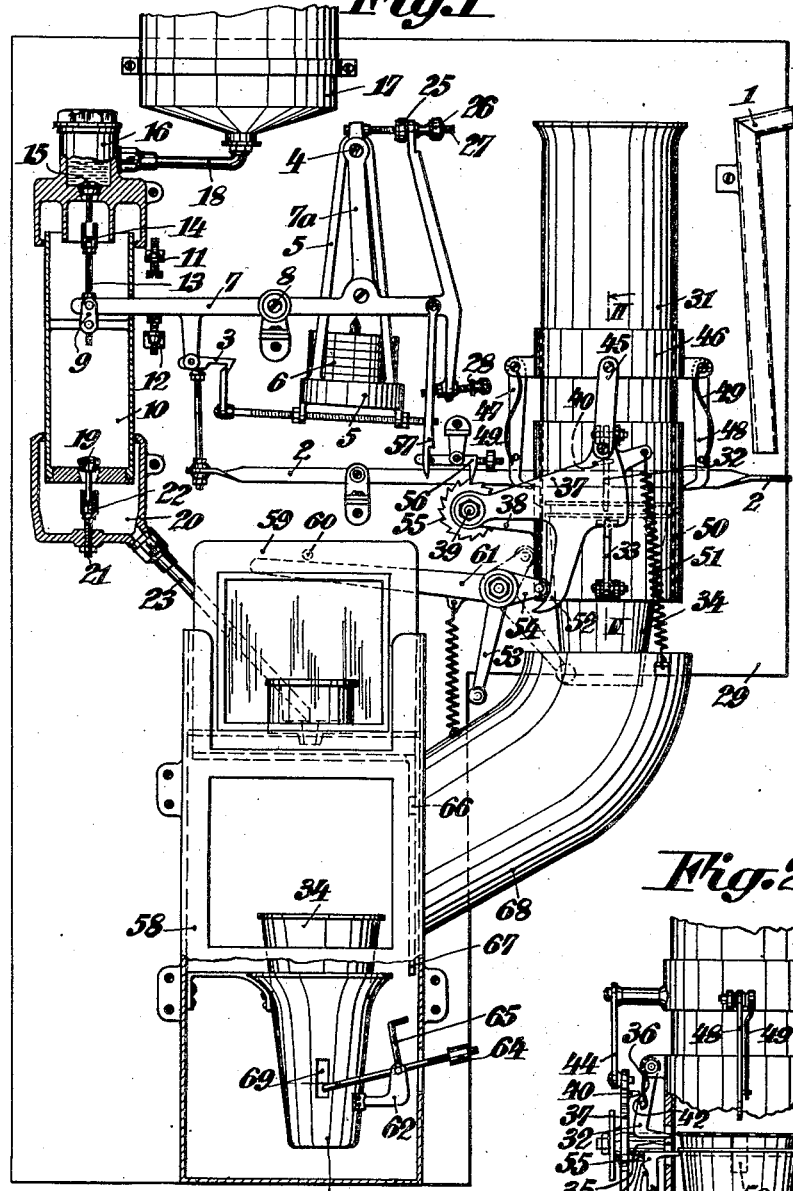
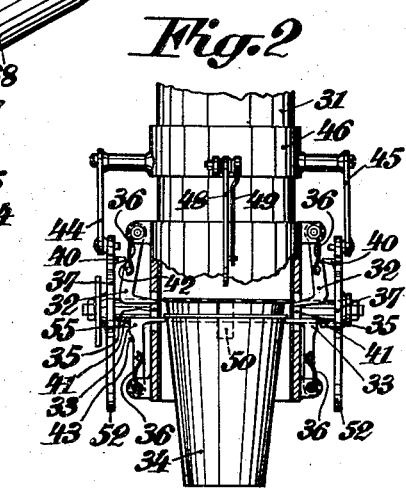
M. Skreta
INVENTOR
By: Marks & Clerk
ATYS.

Patented Aug. 4, 1936

2,050,131

UNITED STATES PATENT OFFICE 2,050,131

COIN FREED LIQUID DISPENSING APPARATUS

Max Skreta, Vienna, Austria, assignor to Leo Scharf, Vienna, Austria

Application March 31, 1933, Serial No. 663,824 In Austria April 11, 1932

1 Claim. (Cl. 249—2)

This invention relates to improvements in means for operating coin-freed machines for vending liquids, particularly drinks, provided with a measuring container which is raised and lowered by a counterpoise or weight, arranged on a balance-beam, and which, on reaching its equilibrium, is overweighted by a member in order to accelerate its descent and quickly operate an outlet valve. In the known coin-freed machines of this kind, the said member consists of a tensioning spring or of a separate weight, which controls the beam of the measuring container at the suitable moment, thus calling for a somewhat complicated mechanism and, in view of its construction, accelerating the movement of the measuring container in one direction only, so that heretofore only the outlet valve of the measuring container has been opened quickly.

The coin-freed liquid dispensing apparatus according to the present invention comprises in combination a balance-beam, an upwardly extending arm pivoted to the latter, a hunting weight, suspended freely movable from said arm, a second arm rigidly secured to said beam, a setscrew mounted on said rigid arm and connected with said pivoted arm, a liquid-measuring vessel carried by said beam and lifted as well as lowered by the latter, a valve admitting liquid to said vessel, operating means establishing communication between said beam and said valve, a second valve for the discharge of the liquid from said vessel, and means connected with and adapted to lift the said second valve.

One mode of carrying out the present invention is illustrated by way of example on the accompanying sheet of drawings in which Fig. 1 is a view of the operating mechanism with the container delivery device partly in section. Fig. 2 shows in longitudinal section the container delivery device, the section being taken on line II—II of Fig. 1.

The coin-freed machine for vending liquids consists of a movable measuring vessel 10, two guides 16 and 20 for the latter and in communication with the supply pipe 18 and the delivery pipe 23 respectively, a storage vessel 17 to which is attached the supply pipe 18, and a balance 7 which co-operates with the measuring vessel 10 and can be set exactly in accordance with the quantity of liquid to be delivered and is held in the position ready for operation by a locking mechanism, adapted to be disengaged by the inserted coin. The measuring vessel is of cylindric shape, and is slidable vertically in the guides 16, 20 being open at its top end and closed at its bottom end by a valve 19 seated in its bottom. The measuring vessel 10 is suspended from one arm of a balance beam 7 by means of a link 9. The balance beam 7 rocks on pivots 8 and the other arm thereof is bent upward and approximately in the middle of the length of this arm is pivotally mounted an upwardly directed link 7ª, which is adjustable with respect to the balance beam 7 by a set screw 27 secured to the free end of said link 7ª and which is fixed in the adjusted position on the upwardly bent part of the balance beam by means of nuts 25, 26. The link 7ª may be bracket-shaped and at its top end carries by means of pivots 4 a swing 5 for the counterpoise 6, which thus can move to and fro in the direction of the beam-arm, thereby varying the moment of load on the arm of the balance beam for the production of an overweight. The exact adjustment of this weight-displacement is effected by adjusting in the link 7ª the place of suspension of the counterpoise by means of the screw 27. The swing 5 is limited against excessive swinging in one direction by an adjustable stop 28 while in the other end position of its swinging movement the swing 5 is caught by a pawl 3 secured to the balance beam 7. The oscillation of the latter is limited by two stops 11 and 12, thereby also limiting exactly the extent of the upward and downward movement of the measuring vessel and thus controlling the inlet and outlet valves 15 and 19 respectively. The latter consist of freely movable valve cones which are opened by forked members 14, 22 adapted to be set by screws 13 and 21 respectively. The forked member 14 is arranged on the measuring vessel or on a part moving with the latter, while the forked member 22 is fixed in the bottom guide 20 within the reach of its valve-shaft. When raising or lowering the measuring vessel, one of the two forked members strikes its co-ordinated valve-shaft and thereby suddenly pushes open the corresponding valve.

The coin-freed machine for vending liquids operates in the following manner:—

The coin, dropped into the coin-chute 1, operates a pivoted locking lever 2, which lifts the pawl 3. Now the latter releases the swing which up to now has been secured in the initial position (Fig. 1). The counterpoise, which in its initial position (Fig. 1) balances the empty measuring vessel, swings outwards until it co-operates with the stop 28 thereby increasing the moment of load and causing an overweight at one side of the balance, whereby the empty measuring vessel is lifted by the balance beam and the inlet valve 15 is opened by the forked member 14. Now the liquid to be discharged flows from the storage vessel 17 through the supply pipe 18 into the measuring vessel which when filled with the predetermined quantity reestablishes the equilibrium of the balance beam 7, whereby the inlet valve is closed by the pressure of the liquid. When the balance beam swings into its position of equilibrium, the counterpoise 6 swings back into its initial position and, owing to the decreasing moment of load now taking place, is the cause of effecting an overweight at the lever arm of the measuring vessel, so that during the downward movement of the latter now suddenly occurring, the outlet valve 19 strikes against the forked member 22 and is opened for the discharge of liquid. The counterpoise 6 is prevented from swinging back since the swing 5 is arrested by the pawl 3 and therefore the measuring vessel remains unhindered in its bottommost position, so that the measured liquid may flow through the open valve in the bottom of the measuring vessel into the guide 20 and pass out by way of the outlet pipe 23. The measuring vessel is changed to the filling position after the insertion of a coin only, so that the quantity of liquid to be discharged does not grow stale but is supplied in the fresh condition directly from the cooled or heated storage tank.

All parts of the coin-freed machine for vending liquids are mounted or arranged on a frame and together with same are inserted in the casing of the coin-freed machine.

The container delivery device essentially consists of a tube 31 for the reception of a stack of containers, a container discharge arrangement arranged on said tube, and a tensioning mechanism which prepares the delivery of the container, is operated by a hand-lever and is held in the pre-tensioned position by a locking device, adapted to be disengaged by the balance-beam.

At each of two diametrically opposite places, the tube 31 is provided with two pivoted arresting levers 32, 33, which are arranged above each other and the free ends of which are disposed from one another at a distance corresponding to the distance of the roll-shaped brim of the containers 34 placed into each other, the free ends of said levers extending through recesses 35 of the tube 31 and within the reach of the roll-shaped brim of the bottommost container. These arresting levers 32, 33 are subjected to the action of springs 36, which have the tendency to move the former out of engagement with the roll-shaped brim of the containers 34. A common control member 37 is accorded to each pair of arresting levers. These control members are segment-shaped and mounted on a common shaft 39 which rotatably rests in bearings 38 of the tube 31. Each control member 37 is provided with two extensions 40, 41, the extension 40 sliding on a curve 42 of the arresting lever 32, while the extension 41 slides on the curve 43 of the arresting lever 33.

The control members 37 are hinged by links 44, 45 to a ring 46 guided on the tube 31, said ring being provided with a number of feed pawls 47, 48. In the present case two feed pawls are provided, which by springs 49 are pressed towards the wall of the tube and are displaced around the tube with respect to the arresting levers 32, 33. In the plane of the feed pawls 47, 48, the tube 31 is provided with elongated slots 50, the top end of which is disposed just above the roll-shaped brim of the bottommost container 34 and extends at an incline.

One of the segment-shaped control members 37 is subjected to the action of a spring 51 and is provided with an arm 52 on which operates a control member 54, which is adapted to be operated by a hand-lever 53, knob, key or the like and which may be in the shape of a lever, provided with a roller, or in the form of a cam-shaped or eccentric member. The pawl gear for arresting the tensioning mechanism consists of a ratchet wheel 55, fixed to the shaft 39 of the control member 37, and of a hinged pawl 56, which engages said ratchet wheel and is adapted to be released therefrom by a link 57, arranged on the balance-beam of the measuring device.

In Figs. 1 and 2 of the drawing, the tensioning mechanism is shown in the position ready for the delivery of a container. After the insertion of a coin, the arresting lever 2 effects the release of the swinging weight 6, so that the balance-beam descends on the weighted side and thereby opens the inlet valve 15 for the filling of the measuring vessel 10. At the same time, the descending arm of the balance-beam by means of its link 57 lifts the pawl 56 out of engagement with the ratchet wheel 55, thereby releasing the container delivery device for the discharge of a container 34. The spring 51 turns immediately the control members 37 and thus operates the arresting levers 32, 33. Thereby the arresting levers 32 at first are moved by the extensions 40 towards the wall of the shaft, so that their free ends engage between the roll-shaped brims of the two bottommost containers 34. When the inward movement of the arresting levers 32 is terminated, the arresting levers 33 are released by the extensions 41, so that they are moved outward by their springs 36 until their arresting free ends release the roll-shaped brim of the bottommost container. The latter is pushed downward by the feed pawls 47, 48. For this object, during the operation of the arresting levers, the feed pawls at first slide on the tube-wall until their free ends are forced by their springs 36 into the elongated slots 50 and engage the top of the brim of the container to be discharged. In this moment the container is pushed downward and away from the container-stack by the downwardly moving feed pawls 47, 48 and drops through the chute 68 and into the container-holder 63 of the delivery compartment 58 of the coin-freed machine, where it is securely held for filling with the liquid.

The delivery compartment 58 of the coin-freed machine is locked by a glass-door 59 which is unlocked only when the container 34 has been filled in part. This door 59 is freely movable in the casing of the coin-freed machine, so that it can be moved up and down without influencing the feed members of the devices for the delivery of the drink and the container. The freely movable door 59 is provided with a pin 60, the bottom side of which is engaged by lever 61, which is secured to the shaft of the hand-lever 53 and is subjected to the action of a spring and lifts up the door 59 for opening the delivery compartment 58 if the hand-lever is operated for placing in tension the container delivery device.

During this placing in tension of the container delivery device, the control members 37 are turned upward again, against the action of their spring 51, by the feed member 54 connected with the hand-lever 53, and thus the arresting levers 32, 33 as well as the feed pawls 47, 48 are lifted out of the reach of the container 34. Thereby the arresting levers 33 are again rocked towards the tube-wall by the extensions 41 of the control members 37 and thereafter the arresting levers 32 are released by the extensions 40 and thus rock outward, so that the whole stack of containers drops slightly and is again suspended from the free ends of the levers 33 which catch the brim of the bottommost container 34. The mechanism is held in this position by the pawl 56, which is released by the arrested balance-beam, and engages the ratchet wheel 55 connecting with the control members 37 and locks the same against rotation in the direction of the action of the spring 51.

The arrangement for locking the door 59 consists of a bracket 62, secured to the container holder 63 and to which is pivoted an arm provided with a counterweight 64. The free ends of said arm pass through openings 69 of the container holder 63 and hold up a container 34. The pivoted arm with the container is balanced by the counterweight 64 and provided with a hooked arresting arm 65 which in the balanced condition engages a hole 66 of a slide 67 secured to the door 59 and thus locks the latter against movement. The pivoted arm disengages the arresting arm 65 whenever the container 34 in the container-holder 63 descends in view of the weight of the supplied liquid, whereby the hooked arm releases the slide 67, so that the door 59 can be pushed upward for giving admittance to the delivery compartment. In this position of the door, the slide 67 closes the mouth of the chute 68. If the door 59 is let down after the removal of the filled container 34, the hooked end of the arresting arm 65 immediately engages the hole 66 of the slide 67 and thus locks the door 59. Now the coin-freed machine is ready for the next delivery.

What I claim is:—

Coin-freed liquid dispensing apparatus comprising in combination a balance-beam, an upwardly extending arm pivoted to the latter, a hunting weight, suspended freely movable from said arm, a second arm rigidly secured to said beam, a set screw mounted on said rigid arm and connected with said pivoted arm, a liquid-measuring vessel carried by said beam and lifted as well as lowered by the beam, a valve admitting liquid to said vessel, operating means establishing communication between said beam and said valve, a second valve for the discharge of the liquid from said vessel, and means adapted to lift the said second valve.

MAX SKRETA.